(12) United States Patent
Watanabe et al.

(10) Patent No.: US 6,781,643 B1
(45) Date of Patent: Aug. 24, 2004

(54) ACTIVE MATRIX LIQUID CRYSTAL DISPLAY DEVICE

(75) Inventors: Makoto Watanabe, Tokyo (JP); Takahiko Watanabe, Tokyo (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 0 days.

(21) Appl. No.: 09/573,185

(22) Filed: May 18, 2000

(30) Foreign Application Priority Data

May 20, 1999 (JP) .......................................... 11-140772

(51) Int. Cl.[7] .......................................... G02F 1/1343
(52) U.S. Cl. .......................................... 349/38; 349/39
(58) Field of Search .............................. 349/38, 39, 54, 349/43, 122, 138, 52, 140; 359/59, 60, 79; 257/72, 59

(56) References Cited

U.S. PATENT DOCUMENTS

| | | | |
|---|---|---|---|
| 5,737,049 A | | 4/1998 | Shin et al. |
| 5,835,168 A | * | 11/1998 | Takeda et al. ................ 349/38 |
| 6,031,589 A | * | 2/2000 | Kim ............................ 349/39 |
| 6,188,452 B1 | * | 2/2001 | Kim et al. ..................... 257/59 |
| 6,232,620 B1 | * | 5/2001 | Katoh .......................... 257/347 |
| 6,268,894 B1 | * | 7/2001 | Aoki et al. .................... 349/38 |
| 6,307,602 B1 | * | 10/2001 | Song ........................... 349/38 |

FOREIGN PATENT DOCUMENTS

| | | |
|---|---|---|
| GB | 2 313 466 | 11/1997 |
| JP | 64-28622 | 1/1989 |
| JP | 4-174822 | 6/1992 |
| JP | HEI-7-225388 | 8/1995 |
| JP | HEI-8-292449 | 11/1996 |

OTHER PUBLICATIONS

"Basis of Amorphous Semiconductor", pp. 164–168, published Nov. 30, 1982, by OHM Company.

* cited by examiner

Primary Examiner—Robert H. Kim
Assistant Examiner—Jeanne Andrea Di Grazio
(74) Attorney, Agent, or Firm—Scully, Scott, Murphy & Presser

(57) ABSTRACT

In an active matrix liquid crystal display device having a thin film transistor array substrate (250) comprising a plurality of scan lines formed on an insulating substrate (100), a plurality of signal lines formed to cross the scan lines, thin film transistors formed near intersections between the scan lines and signal lines, respectively, pixel electrodes connected to one electrodes of the thin film transistors, respectively, and additional capacity portions connected to pixel electrodes (5) connected to source electrodes (4) of the thin film transistors, respectively; in order to provide a higher contrast and to allow driving at a lower voltage, a part of the additional capacity portion is formed, via insulating film (115) and semiconductor (120), between the pixel electrode (5) and that scan line (11) which is connected to a gate electrode (1) of the thin film transistor for switching the pixel electrode (5).

7 Claims, 13 Drawing Sheets

ON STATE ($V_G \cong 15V$)

OFF STATE ($V_G \cong -15V$)

LENGTH (μm) OF a-Si AT ADDITIONAL CAPACITY PORTION

ACTIVE MATRIX LIQUID CRYSTAL DISPLAY DEVICE

BACKGROUND OF THE INVENTION

1. Field of the Invention

The present invention relates to an active matrix liquid crystal display device, and more particularly, to an active matrix liquid crystal display device which has a higher contrast and which can be driven by a lower voltage.

2. Description of the Prior Art

As shown in FIG. 1 and FIG. 2, a conventional active matrix liquid crystal display device has a general constitution comprising a thin film transistor array substrate 150, a transparent opposite substrate (glass substrate) 140 disposed parallel to and spaced from the thin film transistor array substrate 150, and a liquid crystal layer 130 sealed between the thin film transistor array substrate 150 and the opposite substrate 140. Note, FIG. 1 is a plan view showing a unit pixel of the thin film transistor array substrate 150 under the liquid crystal layer 130 of the active matrix liquid crystal display device shown in FIG. 2, while FIG. 2 is a cross-sectional view along a line X—X of FIG. 1 so as to also show those parts above the thin film transistor array substrate 150.

In FIG. 1, the thin film transistor (TFT) is constituted of a gate electrode 1, an amorphous silicon film 119, a drain electrode 3 and a source electrode 4. The gate electrode 1 is electrically connected to a scan line 11 at the applicable stage, the drain electrode 3 is electrically connected to a signal line 12 at this column, and the source electrode 4 is electrically connected to a pixel electrode 5. Reference numeral 13 designates an adjacent signal line, so that a unit pixel is formed in an area surrounded by the scan line 11, a scan line 101 at a preceding stage, and the signal lines 12 and 13.

In a liquid crystal display device having such a constitution when the TFT is turned on for each matrix segment, an electric field is generated between the pixel electrode 5 and an opposite electrode 123 so that the liquid crystal layer 130 sealed between both substrates 100, 140 exhibits an electro-optic effect, such that the panel can display an image as a whole.

FIG. 3 is a diagram showing a gate-source parasitic capacitance of a TFT. As shown in FIG. 3, in an active matrix liquid crystal display device utilizing a TFT, there is generated a gate-source parasitic capacitance $C_{gs}$ in an area where the gate electrode 1, source electrode 4 and drain electrode 3 overlap with each other.

FIG. 4 is a diagram showing an equivalent circuit of one pixel of a conventional liquid crystal display device provided with a TFT element. In FIG. 4, $C_{gs}$ is the parasitic capacitance between the gate electrode 1 and source electrode 4 of the TFT, $C_{LC}$ is a capacity of the liquid crystal layer 130 between the pixel electrode 5 and the opposite electrode 123, and $C_{SC}$ is an accumulation capacity to be formed between the pixel electrode 5 and the scan line 101.

FIG. 5 is a diagram showing a voltage waveform for driving the aforementioned liquid crystal display device, in which the pixel electrode 5 is gradually accumulated with an electric charge such that the pixel electrode potential approaches a potential of the signal line, when the potential of the gate electrode 1 is high. Then, when the gate potential is turned off, the potential of the pixel electrode 5 exhibits a voltage drop, since this potential is pulled toward minus by the gate potential via parasitic capacitance $C_{gs}$. This dropped amount $\Delta V$ is called a feedthrough voltage.

Paying attention to one piece of displaying pixel, it is common to drive a liquid crystal display device by applying an AC voltage having an alternating polarity for each display frame, between the opposite electrode 123 and the pixel electrode 5 so as to ensure the reliability of the device. The parasitic capacitance $C_{gs}$ of a TFT can be regarded as an MIS (Metal-Insulator-Semiconductor) capacitor, and from a qualitative analysis the present applicant has found that the effective value of the MIS capacity at a positive writing differs from that at a negative writing, causing that the magnitudes of the feedthrough voltage $\Delta V$ at a positive writing and a negative writing are different from each other, and the magnitude of $\Delta V$ at the negative writing becomes larger. The details of the above will be fully discussed in the detailed description of the embodiments of the present invention, and will be only briefly discussed here.

Namely, considering that the voltage to be applied to a liquid crystal layer is a difference ($\Delta V_{PI}$ of FIG. 5) between a common electrode potential and a pixel electrode potential, and considering that in a liquid crystal display device a positive writing and a negative writing are generally switched to each other at each frame so as to ensure the reliability; as the feedthrough voltage at the negative writing is larger than the feedthrough voltage at the positive writing, the voltage to be applied to the liquid crystal layer at the time (unselected period) other than the selected interval (the time during which the gate potential is high) becomes larger (i.e., $\Delta V_{PI}$ becomes larger). It has been also qualitatively found that the larger the absolute value of $C_{gs}$, the larger the difference between feedthrough voltages at the positive writing and the negative writing (however, the ratio is substantially constant).

The present applicant has noticed that this phenomenon suggests a possibility that there is exhibited an effect capable of allowing a liquid crystal layer to be applied with a voltage larger than a voltage applied from the exterior, such as by increasing a TFT area or by disposing a plurality of TFT's, i.e., by increasing an MIS capacity to be coupled to the scan line 11 and the pixel electrode 5. However, when a TFT area is increased, there is generally caused such a problem of a reduction of a numerical aperture as well as an electric charge leakage at the off time. Further, when a large delay has occurred in a gate pulse, a considerable electric charge will flow into the pixel electrode until the TFT becomes off, so that the aforementioned voltage amplification effect is reduced.

SUMMARY OF THE INVENTION

The present invention has been carried out in view of the problems as described above, and it is therefore an object of the present invention to provide an improved active matrix liquid crystal display device which has a higher contrast and which can be driven by a lower voltage, while avoiding occurrence of such problems of a reduction of a numerical aperture, a retention property at the off time of the TFT, and a reduction of a voltage amplification effect at the time of delay of a gate pulse, to be considered in a conventional active matrix liquid crystal display device.

The present invention provides, as a solving means for the aforementioned object, an active matrix liquid crystal display device having a thin film transistor array substrate comprising a plurality of scan lines formed on an insulating substrate, a plurality of signal lines formed to cross the scan lines, thin film transistors formed near intersections between the scan lines and signal lines, respectively, and additional capacity portions connected to pixel electrodes connected to source electrodes of the thin film transistors, respectively, in which a part of the additional capacity portion is formed, via insulating film and semiconductor, between the pixel electrode and that scan line which is connected to a gate electrode of the thin film transistor for switching the pixel electrode.

In the active matrix liquid crystal display device having the above constitution, a part of the disposing area of the semiconductor provided between the pixel electrode and the scan line preferably overlaps with the intersection between the signal line and the scan line.

In the active matrix liquid crystal display device having the above constitution, the semiconductors are preferably formed into a string shape on the scan line.

In the active matrix liquid crystal display device having the above constitution, the pixel electrode is preferably overlapped with the scan line at the preceding stage at a portion where the semiconductor at the preceding stage is not formed.

In the active matrix liquid crystal display device having any of the above constitutions, the semiconductor disposed between the pixel electrode and the scan line is preferably constituted of an amorphous silicon film.

In the active matrix liquid crystal display device having any of the above constitutions, the semiconductor disposed between the pixel electrode and the scan line may be constituted of a polycrystal silicon film.

DETAILED DESCRIPTION OF THE PREFERRED EMBODIMENT

There will be described hereinafter the embodiments of an active matrix liquid crystal display device according to the present invention, with reference to the accompanying drawings.

(First Embodiment)

Figure 6:
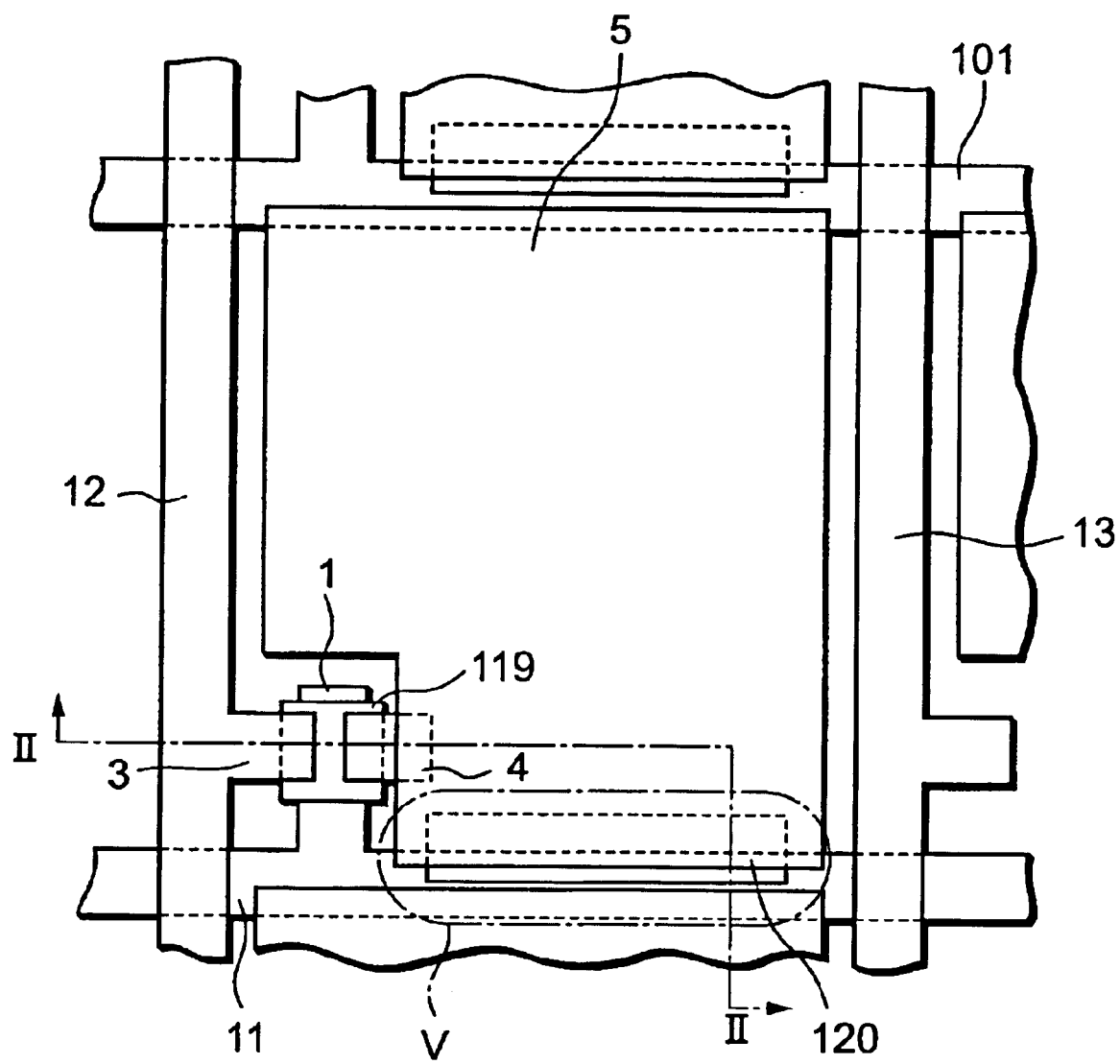
FIG. 6 is a plan view showing a unit pixel of a thin film transistor array substrate provided in an active matrix liquid crystal display device according to a first embodiment of the present invention.
Figure 7:
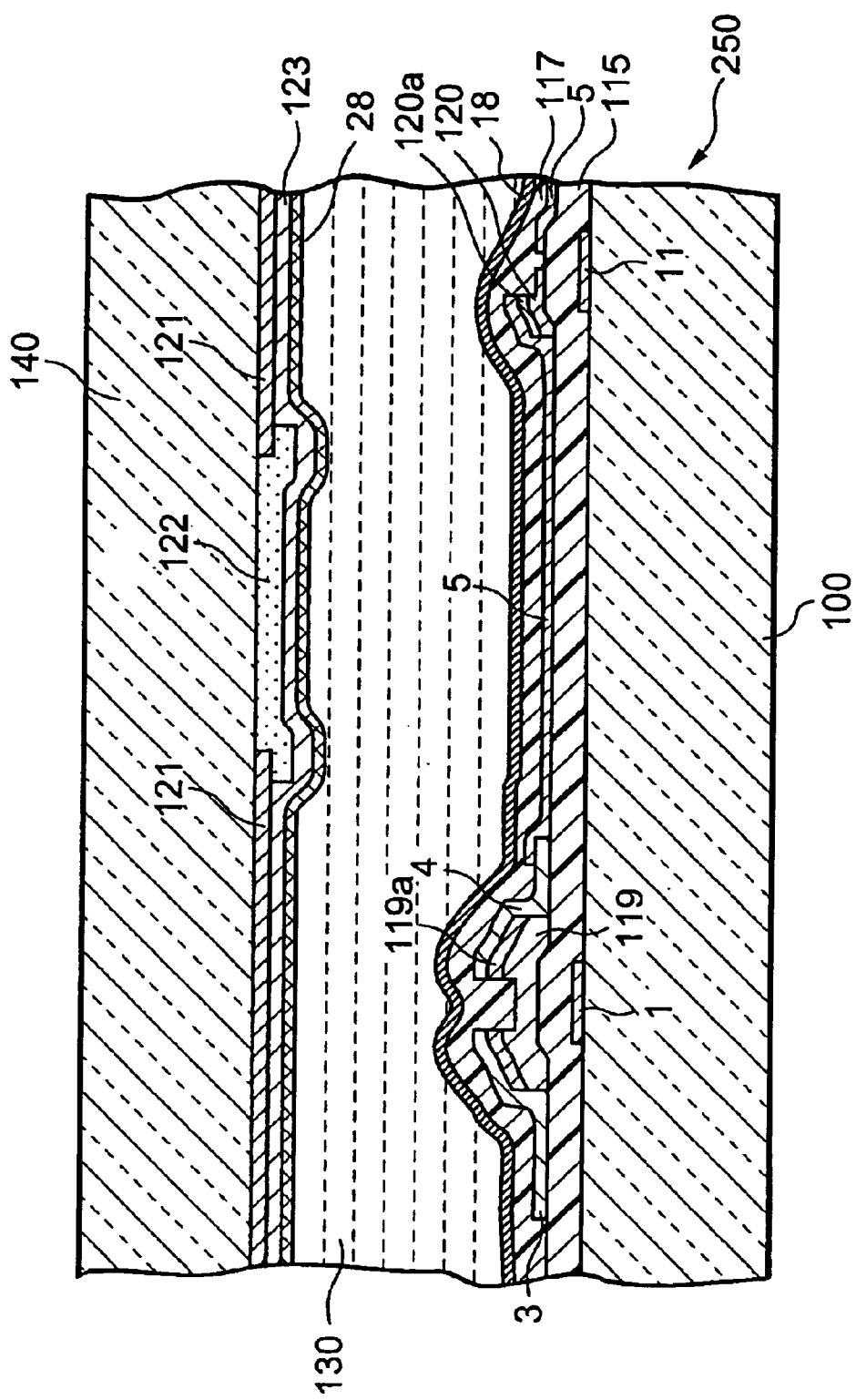
FIG. 7 is a cross-sectional view of the active matrix liquid crystal display device according to the first embodiment of the present invention.

As shown in FIG. 6 and FIG. 7, an active matrix liquid crystal display device has a general constitution comprising a thin film transistor array substrate 250, a transparent opposite substrate (glass substrate) 140 disposed parallel to and spaced from the thin film transistor array substrate 250, and a liquid crystal layer 130 sealed between the thin film transistor array substrate 250 and the opposite substrate 140. Note, FIG. 6 is a plan view showing a unit pixel of the thin film transistor array substrate 250 under the liquid crystal layer 130 of the active matrix liquid crystal display device shown in FIG. 7 (in FIG. 6, depiction of an alignment film 18 is omitted), while FIG. 7 is a cross-sectional view along a line II—II of FIG. 6 so as to show those parts above the thin film transistor array substrate 250.

In FIG. 6, the thin film transistor (TFT) is constituted of a gate electrode 1, an amorphous silicon film 119, a drain electrode 3 and a source electrode 9. The gate electrode 1 is electrically connected to a scan line 11 at the applicable stage, the drain electrode 3 is electrically connected to a signal line 12 at this column, and the source electrode 4 is electrically connected to a pixel electrode 5. Reference numeral 13 designates an adjacent signal line, so that a unit pixel is formed in an area surrounded by the scan line 11, a scan line 101 at a preceding stage, and the signal lines 12 and 13. To form an accumulation capacity, an upper side of the pixel electrode 5 and a lower side of the scan line 101 at the preceding stage are overlapped with each other via gate insulating film 115. Also, the scan line 11 at the applicable stage has a lower side overlapped with an upper side of a pixel electrode at the next stage, to form an accumulation capacity portion. Reference numeral 120 designates an amorphous silicon film for forming an additional capacity according to the present invention, and this amorphous silicon film 120 is provided along an upper side of the scan line 11 at the applicable stage.

To manufacture the active matrix liquid crystal display device according to the first embodiment shown in FIG. 6 and FIG. 7, there is firstly deposited a metal film such as a Cr film by a sputtering method onto a glass substrate 100 as a transparent insulating substrate, and the metal film is selectively etched to thereby form the gate electrode 1 and the scan line 11. Thereafter, a silicon nitride film is deposited by a CVD (chemical vapor deposition) method onto the surface including the gate electrode 1 and the scan line 11, to thereby form the gate insulating film (insulating film) 115. Next, by CVD there are selectively formed amorphous silicon films 119 and 120 forming semiconductor areas above the gate insulating film 115 correspondingly to the gate electrode 1 and partially overlappingly with the scan line 11, respectively; subsequently, there are selectively formed n+ type amorphous silicon films 119a and 120a as ohmic contact layers on the amorphous silicon films 119 and 120, respectively; and thereafter, there is selectively provided on the gate insulating film 115 an ITO (Indium Tin Oxide) film as a transparent electrode on the gate insulating film 115 such that the ITO film partially overlaps with the scan line 101 at the preceding stage, and the amorphous silicon film 120 and the scan line 11 at the applicable stage, to thereby eventually form the pixel electrode 5.

Next, by utilizing the source electrode 4, drain electrode 3 and pixel electrode 5 as the masks, there is removed the n+ type amorphous silicon film 119a in an area corresponding to the gate electrode 1, to thereby form the TFT. Then, by forming a passivation film 117 for the purpose of covering to thereby protect the TFT, signal lines 12, 13 and scan lines 11, 101, there is obtained the thin film transistor array substrate 250. Here, as shown in FIG. 6, there is formed an accumulation capacity $C_{SC}$ at an overlapped portion between the upper side of the pixel electrode 5 and the lower side of the scan line 101 at the preceding stage. Further, to align the liquid crystal layer 130, there is formed on the passivation 117 the alignment film 18 comprising an organic film such as a polyimide resin, and there is conducted an aligning treatment.

Meanwhile, on the lower surface of the glass substrate 140 at the upper opposite electrode side over the liquid crystal layer 130, i.e., on the surface of the substrate 140 facing to the glass substrate 100, there are formed opaque light shielding layer 121, color layer 122, ITO-formed opposite electrode 123, and an alignment film 28, in this order.

Figure 8:
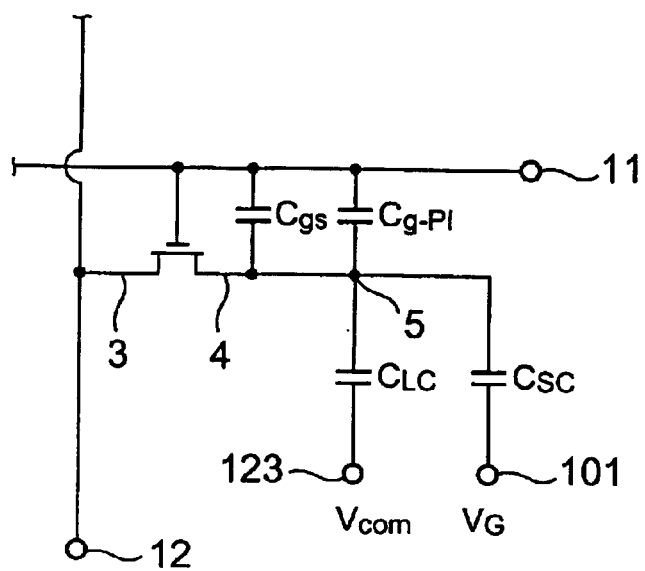
FIG. 8 is an equivalent circuit diagram of one pixel of the active matrix liquid crystal display device according to the first embodiment of the present invention.

FIG. 8 shows an equivalent circuit diagram of one pixel of the active matrix liquid crystal display device according to the first embodiment of the present invention. The equivalent circuit of one pixel of the liquid crystal display device of this embodiment differs from the equivalent circuit diagram of one pixel of the conventional active matrix liquid crystal display device shown in FIG. 4, in that the former has an MIS (Metal-Insulator-Semiconductor) capacity newly formed between the scan line 11 at the applicable stage and the pixel electrode 5. Namely, the difference compared with the conventional active matrix liquid crystal display device is that there is disposed the amorphous silicon film 120 in a form overlapping with the scan line 11 and the pixel electrode 5. This amorphous silicon film 120 can be formed simultaneously with the forming process of the amorphous silicon film 119 at the TFT portion, so that no additional forming processes and materials are required.

There will be hereinafter described an operation of the active matrix liquid crystal display device of the first embodiment.

Similarly to the conventional active matrix liquid crystal display device, in the active matrix liquid crystal display device of the first embodiment, when the TFT is turned on for each matrix segment, there is generated an electric field between the pixel electrode 5 and the opposite electrode 123 so that the liquid crystal layer 130 sealed between both substrates 100, 140 exhibits an electro-optic effect, such that the panel can display an image as a whole.

The operational difference between the liquid crystal display device of this embodiment and the prior art resides in that the difference between the feedthrough voltage at the positive writing and that at the negative writing becomes larger than the conventional. The reason thereof will be described hereinafter.

As calculated based on the equivalent circuit of FIG. 8, the feedthrough voltage $\Delta V$ of the first embodiment is represented by the following approximate expression (1):

$$\Delta V = (V_{gon} - V_{goff}) * (C_{gs} + C_{g-PI}) / (C_{gs} + C_{g-PI} + C_{LC} + C_{SC}) \quad (1)$$

It is a feature that, as an MIS capacity to be connected to the gate electrode 1, scan line 11 and pixel electrode 5, there is provided a capacity $C_{g-PI}$ newly formed by the scan line 11-gate insulating film 115-amorphous silicon film 120, in addition to the gate-source parasitic capacitance $C_{gs}$ at the TFT portion.

Then, based on the phenomenon as previously discussed with reference to the prior art, an absolute value of the feedthrough voltage becomes large, and the difference between feedthrough voltage at the positive writing and that at the negative writing becomes large. In the present invention, the total amount of the MIS capacity is large, so that the voltage to be applied between the opposite electrode 123 and the pixel electrode 5 is increased as compared to the conventional. It will be qualitatively described hereinafter that the effect at that time becomes more remarkable as the provided MIS capacity is larger.

Figure 4:
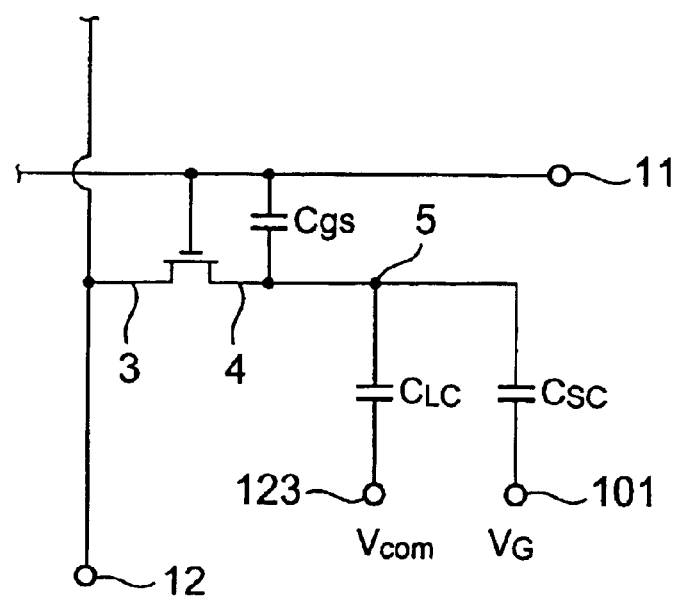
FIG. 4 is an equivalent circuit diagram of one pixel of the conventional liquid crystal display device.
Figure 5:
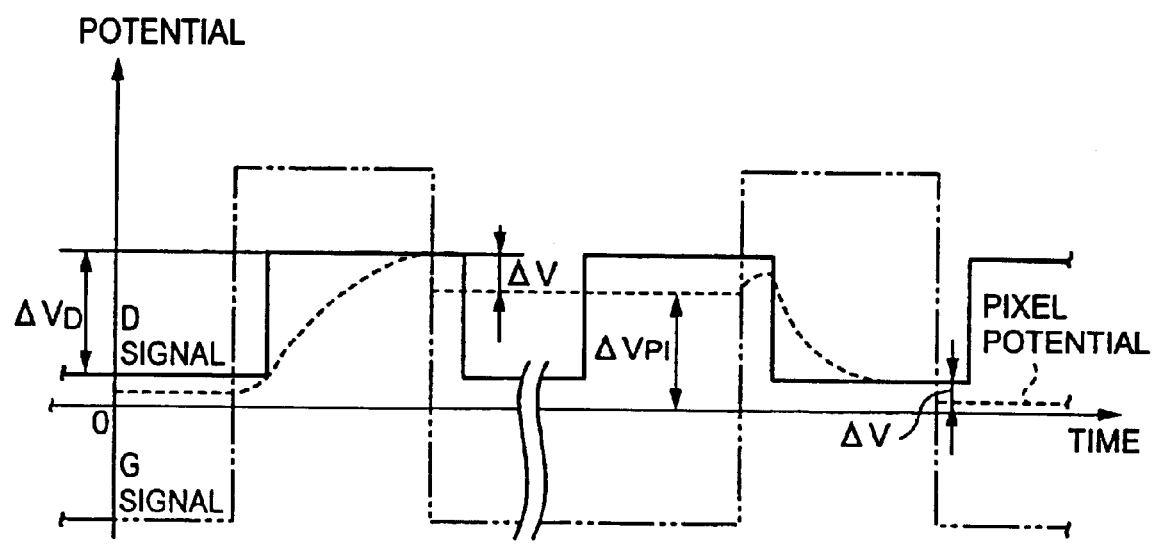
FIG. 5 is a diagram showing a voltage waveform of the conventional active matrix liquid crystal display device.

Referring to the equivalent circuit of FIG. 4 and the voltage waveform of FIG. 5, the feedthrough voltage $\Delta V$ in the conventional example can be approximately derived by the following equation (2), in which $V_{gon}$ and $V_{goff}$ mean a high level voltage and a low level voltage of the gate voltage waveform, respectively:

$$\Delta V = (V_{gon} - V_{goff}) * C_{gs} / (C_{LC} + C_{SC} + C_{gs}) \quad (2).$$

The capacity $C_{LC}$ of the liquid crystal layer 130 varies dependently on the displaying state of the liquid crystal, so that the $\Delta V$ varies dependently on the displaying state (white, half tone, and black). To avoid a flickering, there is applied to the opposite electrode 123 a voltage which is at a center of a pixel electrode potential at a half tone display which exhibits the highest visibility.

Paying attention to one piece of displaying pixel, it is common to drive a liquid crystal display device by applying an AC voltage having an alternating polarity for each display frame, between the opposite electrode 123 and the pixel electrode 5 so as to ensure the reliability of the device.

It will be described hereinafter that the magnitude of the feedthrough voltage $\Delta V$ represented by the equation (2) at the positive writing differs from that at the negative writing. This is due to the fact that the effective value of the parasitic capacitance $C_{gs}$ at the positive writing differs from that at the negative writing.

There will be sequentially explained the reason why there is caused a difference between such effective values of the parasitic capacitance $C_{gs}$.

Figures 9A, 9B:
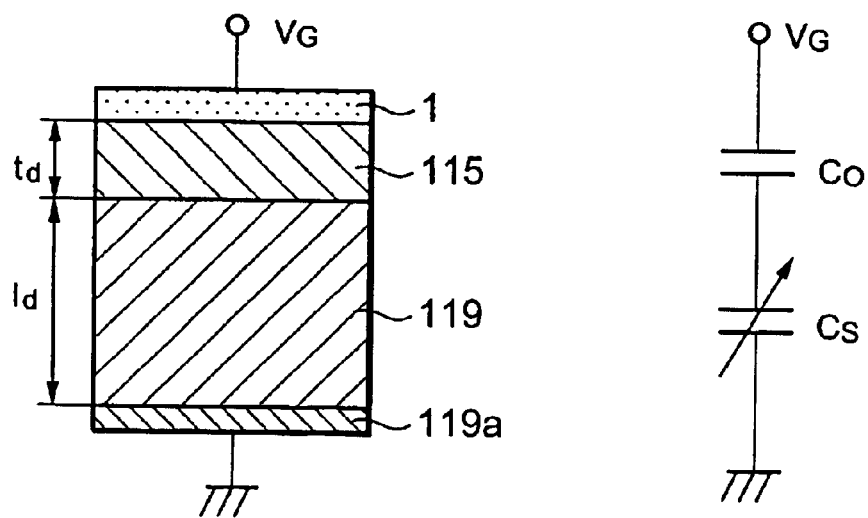
FIG. 9A is a schematic cross-sectional view for explaining a behavior of an MIS capacity.
FIG. 9B is an equivalent circuit diagram of the MIS capacity shown in FIG. 9A.

Firstly, there shall be obtained a relationship between a capacity C between the gate electrode and the ground, and the gate voltage $V_G$, making use of the MIS (Metal-Insulator-Semiconductor) capacitor shown in FIG. 9.

The capacity C can be regarded as a series connection of a capacity $C_O$ of the gate insulating film and a capacity $C_S$ of the amorphous silicon film. Assuming that the thickness of the oxide film (gate insulating film 115) be td, its specific dielectric constant be $K_0$, and a dielectric constant of a vacuum be $\epsilon_0$, the fixed capacity $C_0$ per unit area of the oxide film can be represented by the following equation (3):

$$C_0 = K_0 \epsilon_0 / td \qquad (3).$$

Next, the capacity of the amorphous silicon film varies depending on a distribution of generated carriers, and this distribution depends on the application of the gate voltage $V_G$ (see a reference literature "Basis of Amorphous Semiconductor", pp. 164–168, published Nov. 30, 1982, by OHM Company).

Figure 10A:
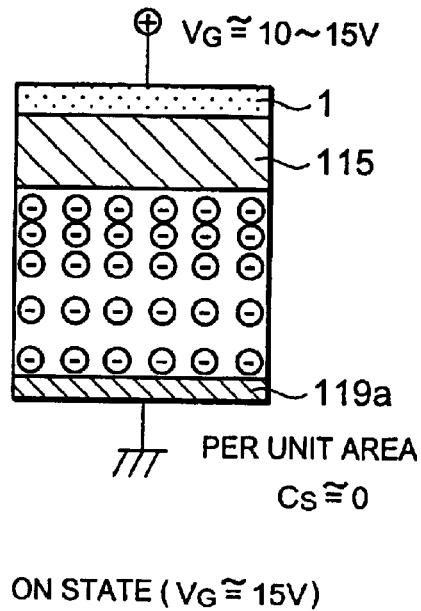
FIG. 10A is an explanatory view showing a transition of the MIS capacity under a gate-on state.
Figure 10B:
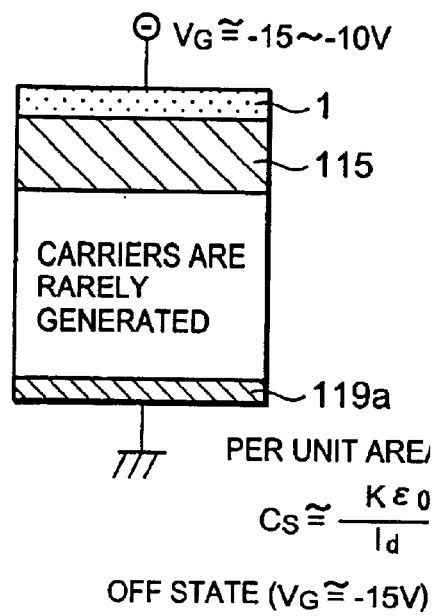
FIG. 10B is an explanatory view showing a transition of the MIS capacity under a gate-off state.

FIG. 10 is a diagram showing a transition of the MIS capacity at the time of gate on and off. When an ON voltage is applied to the gate electrode 1, there are generated carriers within the n+ type amorphous silicon film 119a as shown in FIG. 10A. These carriers are distributed due to a drift current flown by carriers driven by an electric field within the amorphous silicon film 119a, and due to a diffusion current flown by carriers driven by a density gradient of carriers. In this case, taking into consideration the above discussion and that in a liquid crystal display device a certain amount of light impinges the amorphous silicon film 119a due to a light reflection within the panel so that photo carriers have been generated; most of carriers can be approximated to exist throughout the whole of the film, and the capacity $C_S$ of the amorphous silicon film 119a can be regarded as:

$$C_S = 0 \qquad (4).$$

Figure 1:
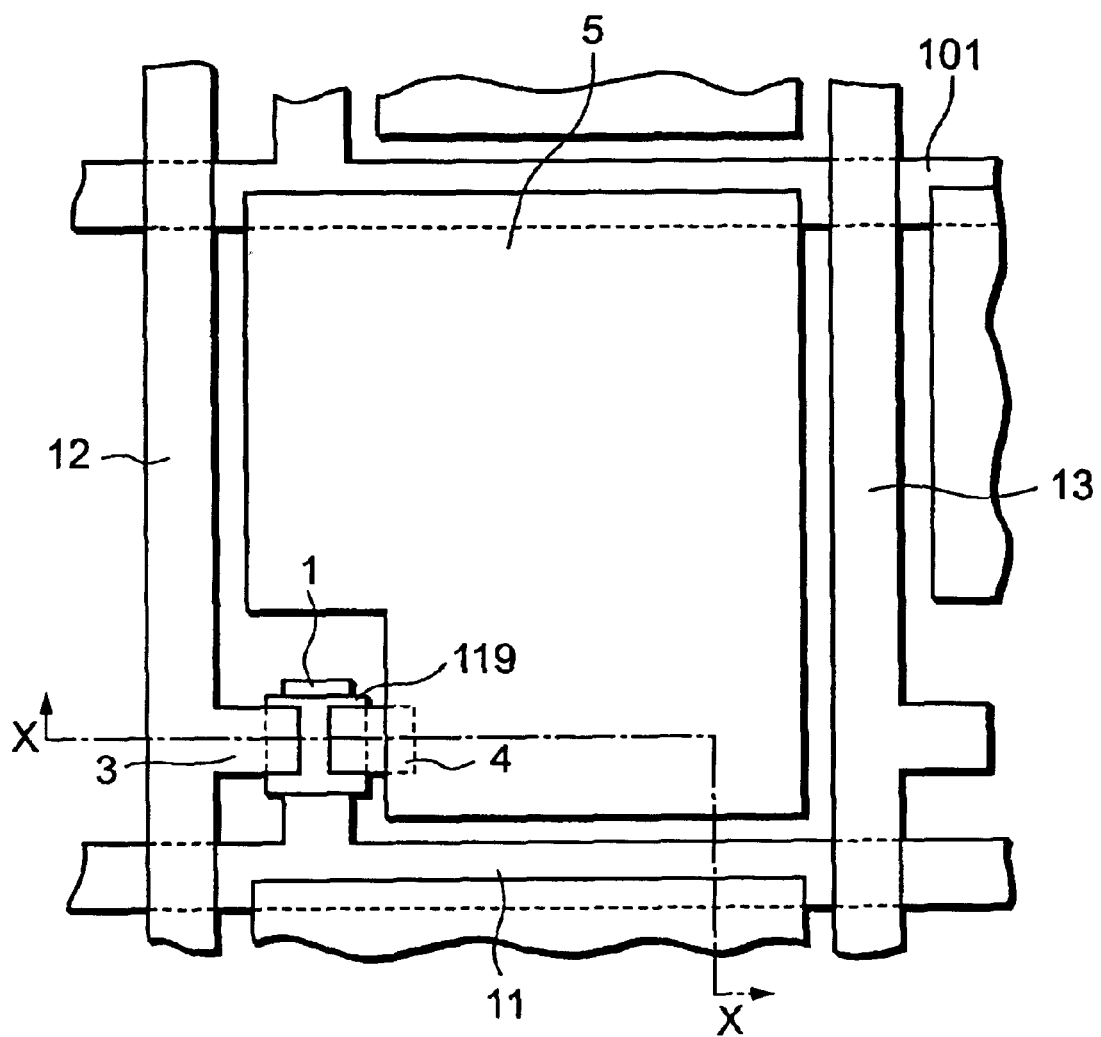
FIG. 1 is a plan view showing a unit pixel of a thin film transistor array substrate provided in a conventional active matrix liquid crystal display device.
Figure 2:
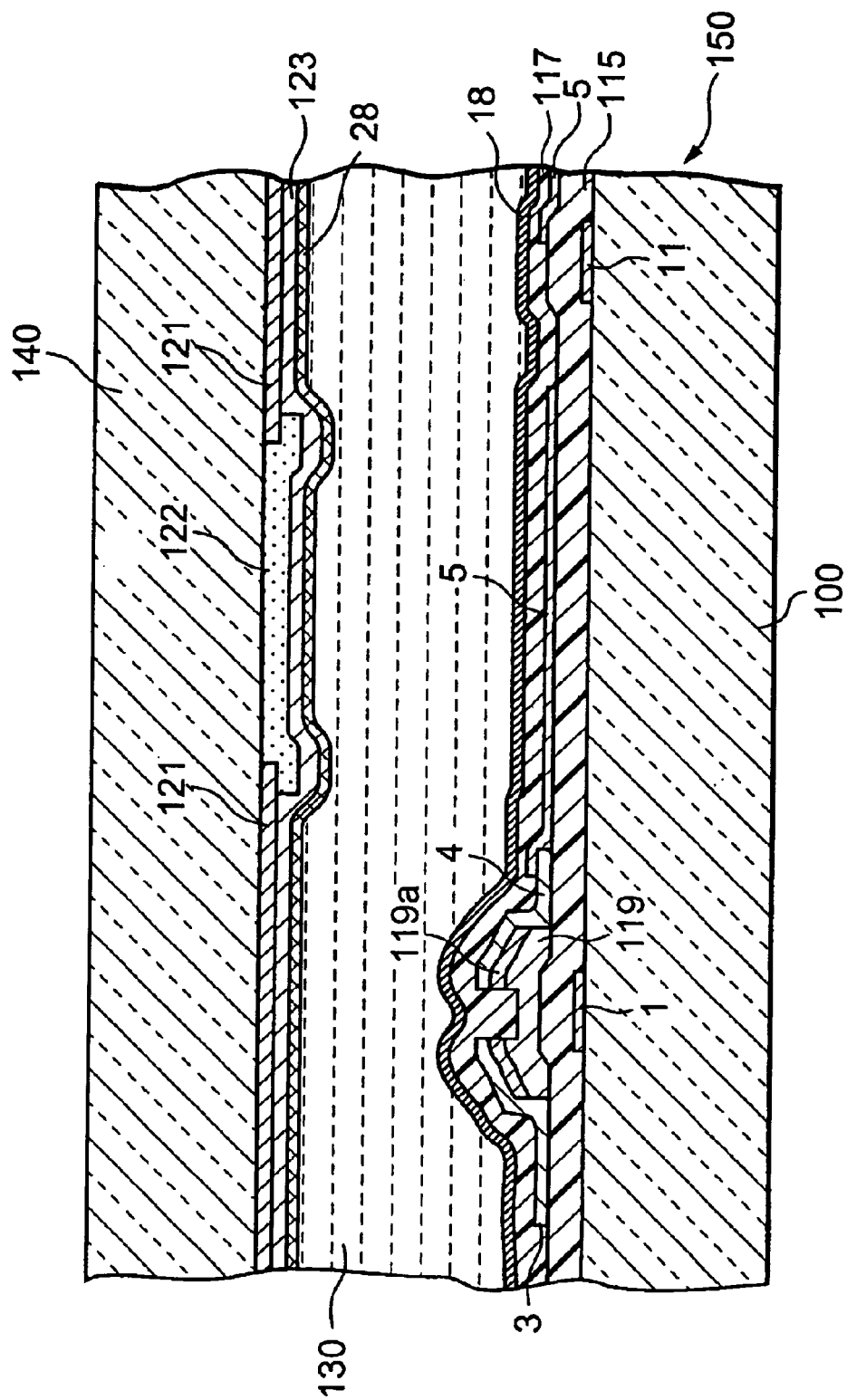
FIG. 2 is a cross-sectional view of the conventional active matrix liquid crystal display device.
Figure 3:
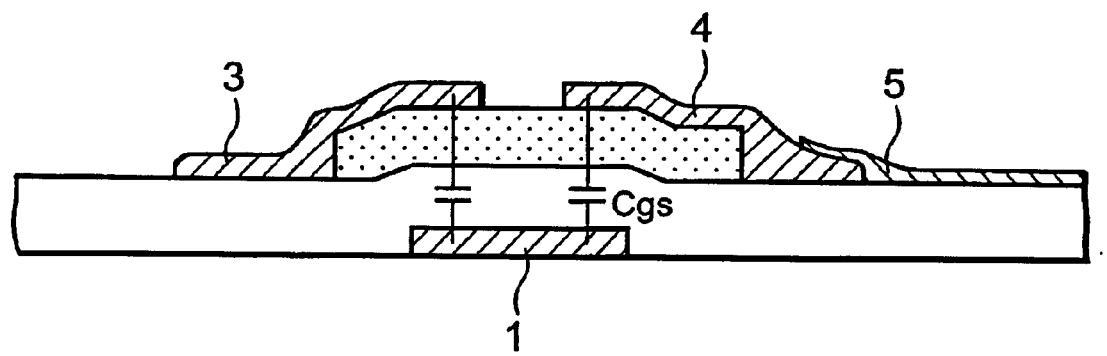
FIG. 3 is an explanatory view of a gate-source parasitic capacitance $C_{gs}$ at a TFT gate portion.

Next, when an OFF voltage is applied to the gate electrode 1, i.e., when the connection between the drain electrode 3 and the source electrode 4 in FIG. 3 is approximately opened, the carrier density within the amorphous silicon film 119a is low so that this film can be regarded as a substantial insulating film. Namely, assuming that the thickness of the amorphous silicon film be "ld" and the dielectric constant be K, the variable capacity $C_S$ per unit area formed by the amorphous silicon film 119a is represented by the following equation (5):

$$C_S = K \epsilon_0 / ld \qquad (5).$$

(Of course, when the gate voltage is further reduced, holes are formed to approach the state of FIG. 10A.)

Figure 11:
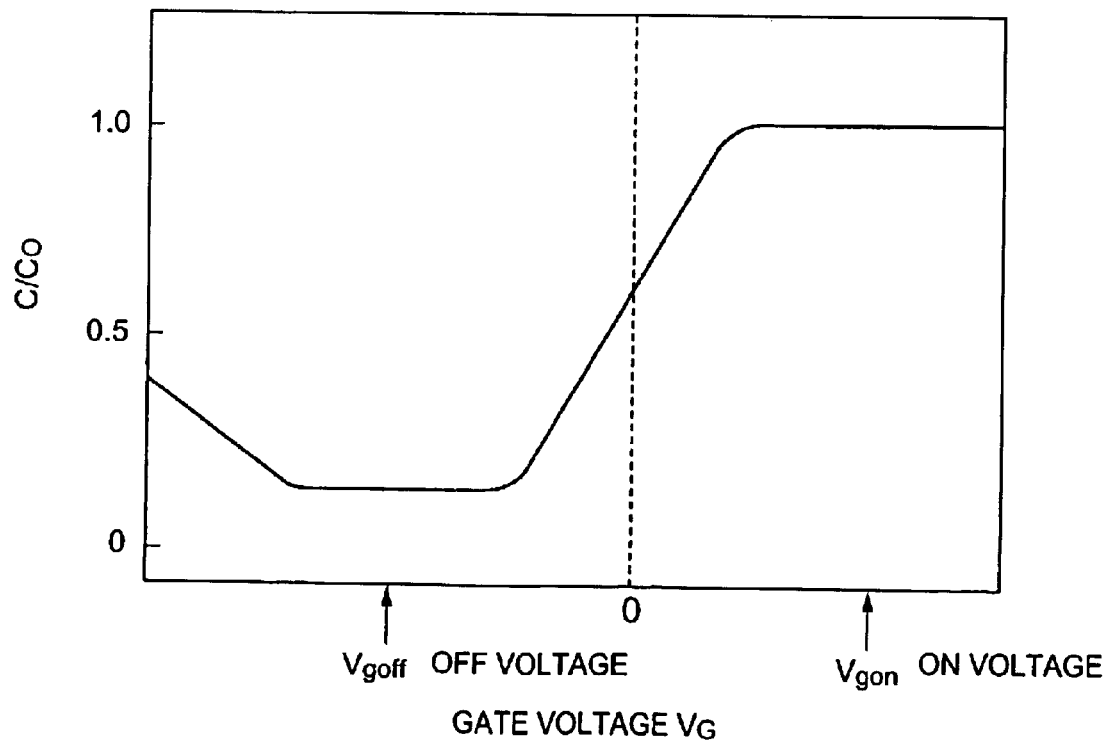
FIG. 11 is a characteristic diagram showing a dependency of the MIS capacity on a gate voltage.

Qualitatively drawing a C-$V_G$ curve taking into consideration the above will result in FIG. 11. Namely, comparing the MIS capacity under an ON state of the TFT and the MIS capacity under an OFF state, the MIS capacity under the ON state qualitatively becomes large. Here, attention shall be paid to the fact that the gate voltage at which the TFT becomes ON is determined not in an absolute manner but in a relative manner depending on the potentials of the source electrode and the drain electrode.

Figure 12:
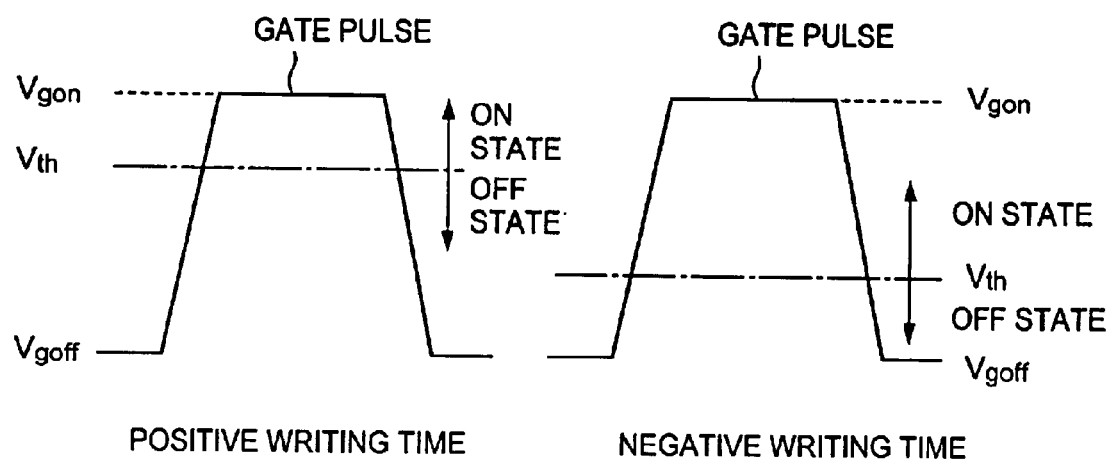
FIG. 12A is an explanatory view showing a difference of a feedthrough at a positive writing into a pixel electrode.
FIG. 12B is an explanatory view showing a difference of a feedthrough at a negative writing into a pixel electrode.

Next, using FIG. 12, there will be qualitatively considered the reason why there is caused a difference between the magnitude of feedthrough voltage $\Delta V$ upon writing a positive potential relative to a common electrode potential and that upon writing a negative potential relative to the common electrode potential.

When approximating the TFT characteristics with two values of the ON state and the OFF state, the MIS capacities, i.e., the gate-source parasitic capacitances $C_{gs}$ in case of TFT at the respective states are different from each other as described above. Namely, assuming that the gate voltage at which the TFT is turned ON be written as $V_{th}$ (threshold voltage), the following equation is given:

$$Cgs_{(VG>Vth)} > Cgs_{(VG<Vth)} \qquad (6).$$

By rewriting the aforementioned equation (2) in view of the equation (6), the following equation is obtained:

$$\Delta V = \{(V_{gon} - V_{th}) * Cgs_{(VG>Vth)}/(C_{LC} + C_{SC} + Cgs_{(VG>Vth)})\} + \{(V_{th} - V_{goff}) * Cgs_{(VG<Vth)}/(C_{LC} + C_{SC} + Cgs_{(VG<Vth)})\} \qquad (7).$$

As described above, the threshold voltage $V_{th}$ of TFT is determined by the relationship with the source electrode potential and the drain electrode potential. Thus, in case of a positive writing into a pixel of a liquid crystal display device, i.e., in case of writing a positive potential relative to the common electrode potential into a pixel electrode, the gate potential $V_{th}$ at which the TFT is turned OFF has become relatively high as shown in FIG. 12A because both of the drain and source electrodes have been applied with positive potentials relative to the common electrode.

Contrary, in case of a negative writing, i.e., in case of writing a negative potential relative to the common electrode potential into a pixel electrode, the gate potential at which the TFT is turned OFF has become relatively low as shown in FIG. 12B because both of the drain and source electrodes have been applied with negative potentials relative to the common electrode.

From the result of the discussion of the dependency of the MIS capacity on a gate voltage, the gate-source parasitic capacitance $C_{gs}$ under an ON state of the TFT becomes larger than that at the OFF state of the TFT (see equation (6)). Then, from the equation (7), it can be understood that $\Delta V$ in case of a negative writing becomes large to an extent that $V_{th}$ is low ($V_{gon} - V_{th}$ is large).

Only, since a current flows from the drain electrode 3 into the pixel electrode 5 up to a certain extent during the ON time, this effect due to the variation of $C_{gs}$ is slightly mitigated. However, considering an ON resistance ($\sim 10^6$ ohms) of the TFT rendering an a-Si to be an active area, the inflow current is in a small amount. When considering that the voltage to be applied to a liquid crystal layer is a difference ($\Delta V_{PI}$ of FIG. 5) between a common electrode potential and a pixel electrode potential, and considering that in a liquid crystal display device a positive writing and a negative writing are generally switched to each other at each frame so as to ensure the reliability; as the feedthrough voltage at the negative writing is larger than the feedthrough voltage at the positive writing, the voltage to be applied to the liquid crystal layer at the time (unselected period) other than the selected interval (the time during which the gate potential is high) becomes larger ($\Delta V_{PI}$ becomes larger). The larger the absolute value of $C_{gs}$, the larger the difference between feedthrough voltages at the positive writing and the negative writing (however, the ratio is substantially constant). Thus, in the present invention, there is realized a voltage amplification effect capable of allowing the liquid crystal layer to be applied with a voltage larger than a voltage applied from the exterior, by increasing the MIS capacity to be coupled to the scan line 11 and the pixel electrode 5.

Figure 13:
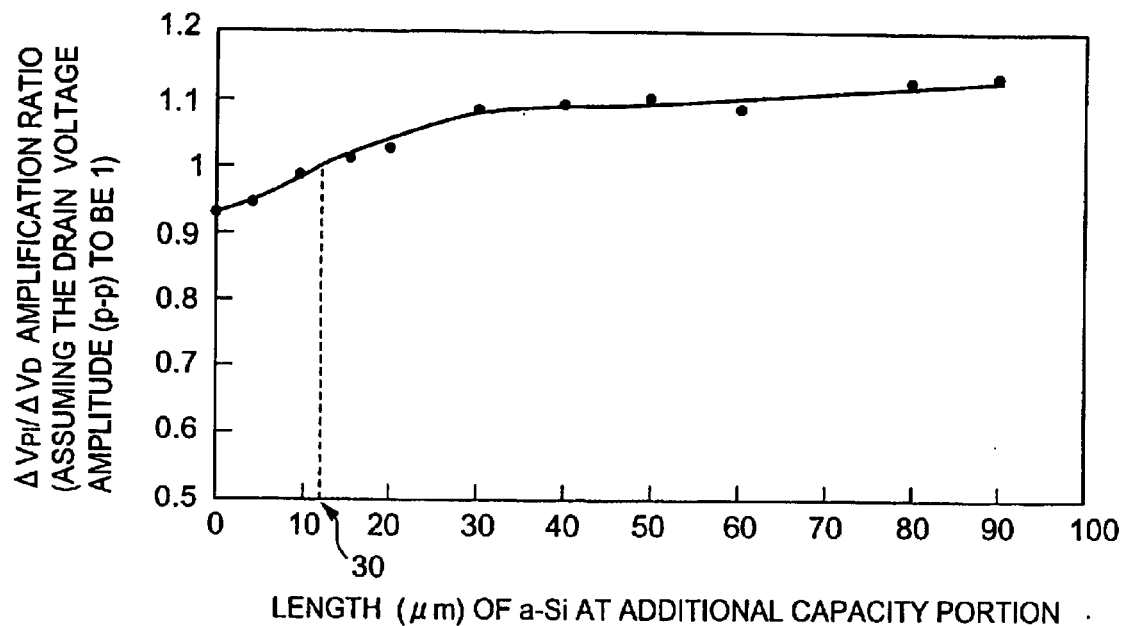
FIG. 13 is a characteristic diagram showing an effect of the active matrix liquid crystal display device according to the first embodiment of the present invention.
Figure 14:
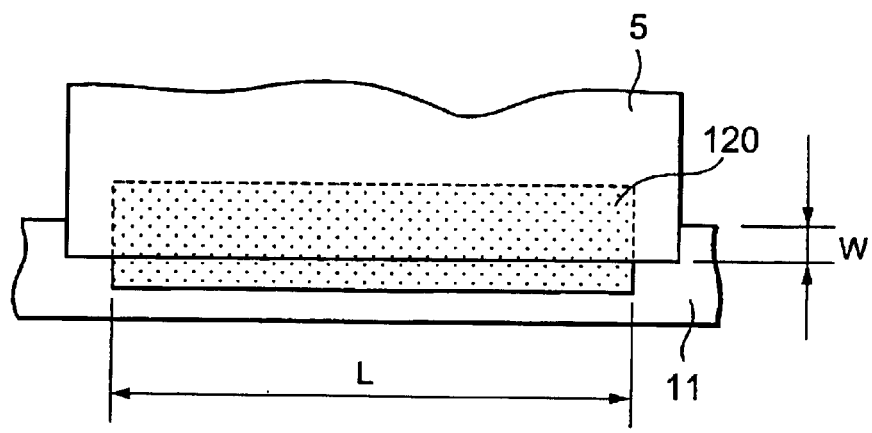
FIG. 14 is an enlarged view of a portion surrounded by a line V in FIG. 6.

FIG. 13 shows a result of a quantitative estimation of an increasing amount of an applied voltage to the liquid crystal layer 130, by actually executing a circuit simulation. FIG. 14 is an enlarged view of a portion surrounded by a line V in FIG. 6. Concerning a situation where the pixel electrode 5 is overlapped with the scan line 11 with an overlapping width W of 3 $\mu$m and where the length L of the amorphous silicon 120 is increased, there is calculated a ratio ($\Delta V_{PI}/\Delta V_D$) of the applied voltage $\Delta V_{PI}$ to the liquid crystal layer 130 relative to the drain voltage amplitude (peak-to-peak) $\Delta V_D$.

From FIG. 13, it is understood that a voltage larger than the drain voltage amplitude can be applied to the liquid crystal, when the overlapping length L between the scan line 11 and amorphous silicon film 120 is extended by about 13 μm or more. There is not a particular upper limit of the overlapping length L, and the width of the pixel electrode 5 is the maximum. However, as shown in FIG. 13, when the overlapping length L becomes about 30 μm or more, the amplification ratio gradually approaches a saturated state, so that a preferable overlapping length L appears to be 30 to 90 μm. This is converted into an overlapping area of 90 to 270 μm². Considering that the width of the scan line 11 is usually on the order of 10 μm and the width of the pixel electrode 5 is on the order of 100 μm, and considering such as a discrepancy tolerance of matrixing on manufacturing and a numerical aperture, the formed dimension of the amorphous silicon film 120 is preferably of a width on the order of 10 μm. Further, its length may be selected so as to satisfy the aforementioned overlapping length L. Although the overlapping width W may slightly vary such as due to a matrixing discrepancy, the overlapping length L is preferably set to be relatively longer 50 μm to thereby approach the saturated state, so that a dispersion in the amplification effect can be restricted.

Such an applied voltage amplification effect seems to be obtained by such a constitution where a size of TFT is simply increased or a plurality of TFT's are provided. However, an increase in an area of a TFT will generally cause such a problem that a numerical aperture is decreased and a leak current at a retention time is increased, to thereby deteriorate the characteristics of a liquid crystal display device. Further, when a gate pulse is delayed, a current is flown from the drain electrode into the pixel electrode until the TFT is turned off, thereby further reducing the applied voltage amplification effect.

According to the active matrix liquid crystal display device of the first embodiment, there is provided the amorphous silicon film 120 as a semiconductor layer in the form overlapping with the scan line 11 and the pixel electrode 5 at the applicable stage, so that a lower voltage driving is realized without increasing a manufacturing cost. Thus, there can be realized a provision of a liquid crystal display device having a lower power consumption. Further, in the active matrix liquid crystal display device of the first embodiment, when the power consumption is set equally to that of the conventional, there can be provided a liquid crystal display device having a higher display quality realizing a higher contrast and a faster response.

Thus, according to the active matrix liquid crystal display device of the first embodiment, there can be provided an active matrix liquid crystal display device which has a higher contrast and which can be driven by a lower voltage, while avoiding occurrence of such problems of a reduction of a numerical aperture, a retention property at the off time of the TFT, and a reduction of a voltage amplification effect at the time of delay of a gate pulse, to be considered in a conventional active matrix liquid crystal display device.

In this embodiment, there has been exemplarily described a liquid crystal display device adopting such a scheme that a vertical electric field is applied to a glass substrate. However, the present invention can be applied to any type of liquid crystal display device using a TFT, such as even a liquid crystal display device adopting such a scheme that an electric field is parallelly applied to a glass substrate such as disclosed in Japanese Patent Application Laid-Open No. HEI-7-225388. Further, there has been described a situation where Cr is adopted as a wiring material in this embodiment. However, the wiring material to be used in the present invention need not be Cr and may be any other wiring material. Further, there has been described a situation where an amorphous silicon film is used as a semiconductor film. However, according to the present invention, there can be expected a similar effect at a various extent even when other semiconductor film such as a polycrystal silicon film is alternatively used as the semiconductor film.

Note, as a liquid crystal display device having a similar structure, there has been disclosed a technique in Japanese Patent Application Laid-Open No. HEI-8-292449 in which an MIS capacity is formed between the pixel electrode 5 and the scan line 101 at the preceding stage, not between the pixel electrode 5 and the scan line 11 at the applicable stage. However, this merely functions as an accumulation capacity, and fails to possess a function of the present invention to increase the voltage between the pixel electrode 5 and the opposite electrode 123.

(Second Embodiment)

Figure 15:
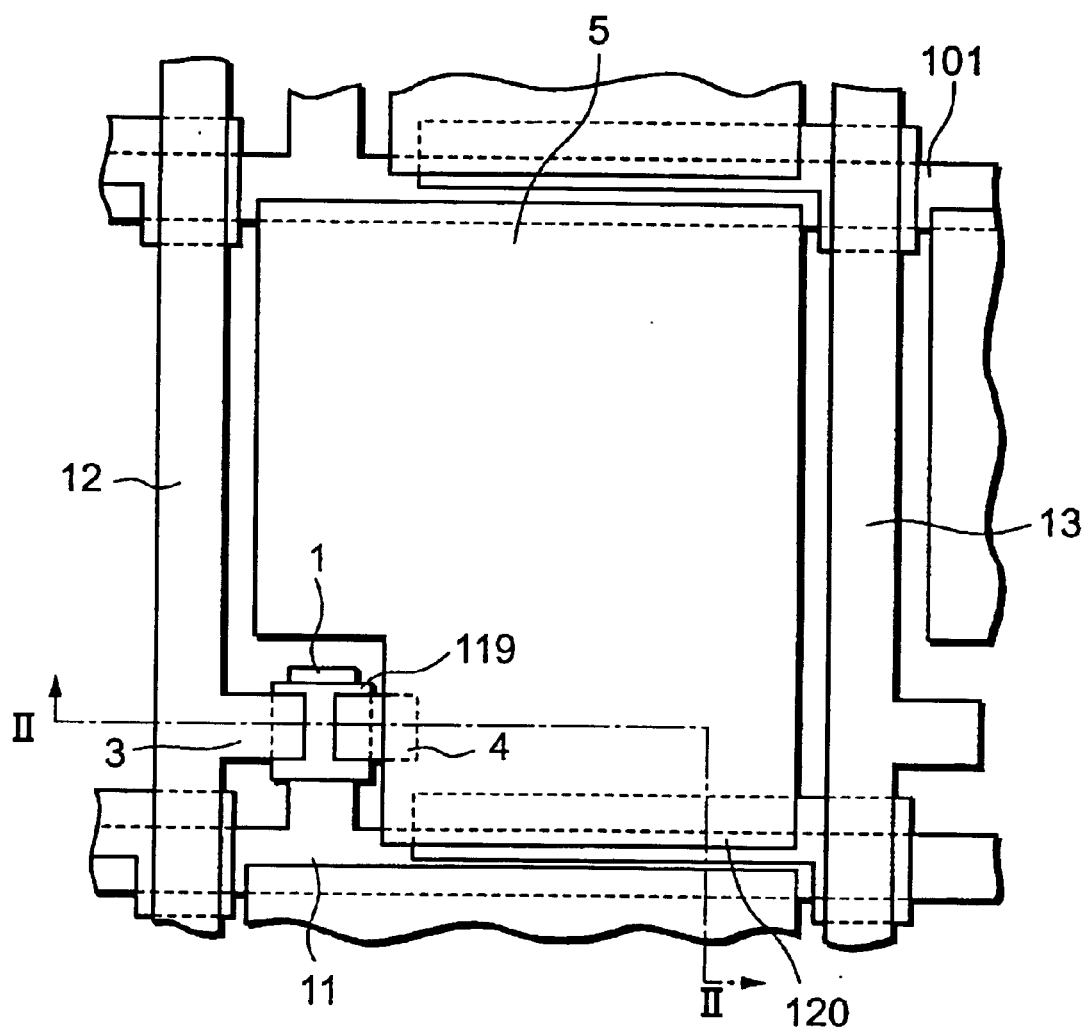
FIG. 15 is a plan view showing a unit pixel of a thin film transistor array substrate provided in an active matrix liquid crystal display device according to a second embodiment of the present invention.

FIG. 15 is a plan view showing a unit pixel of a thin film transistor array substrate provided in an active matrix liquid crystal display device according to a second embodiment of the present invention.

The active matrix liquid crystal display device of the second embodiment shown in FIG. 15 differs from the active matrix liquid crystal display device of the first embodiment shown in FIG. 6 and FIG. 7, in that the amorphous silicon film 120 provided between the scan line 11 and pixel electrode 5 is extended up to a crossover portion between the scan line 101 and a signal line 13.

The electric behavior of this active matrix liquid crystal display device of the second embodiment is identical with that of the active matrix liquid crystal display device of the first embodiment. However, the amorphous silicon film 120 exists in a manner disposed between the scan line 11 and signal line 13 at their crossover portion. Thus, there is reduced an interlayer short between the scan line 11 and signal line 13 during a manufacturing process. As compared to the first embodiment, the capacity to be connected to the scan line 11 is increased so that the delay of a gate pulse to be applied to the scan line is increased.

The active matrix liquid crystal display device of the second embodiment is constituted in the above manner, to thereby advantageously realize a provision of an inexpensive liquid crystal display device thanks to an improved manufacturing yield by the reduction of an interlayer short, in addition to the effect obtained by the active matrix liquid crystal display device of the first embodiment.

(Third Embodiment)

Figure 16:
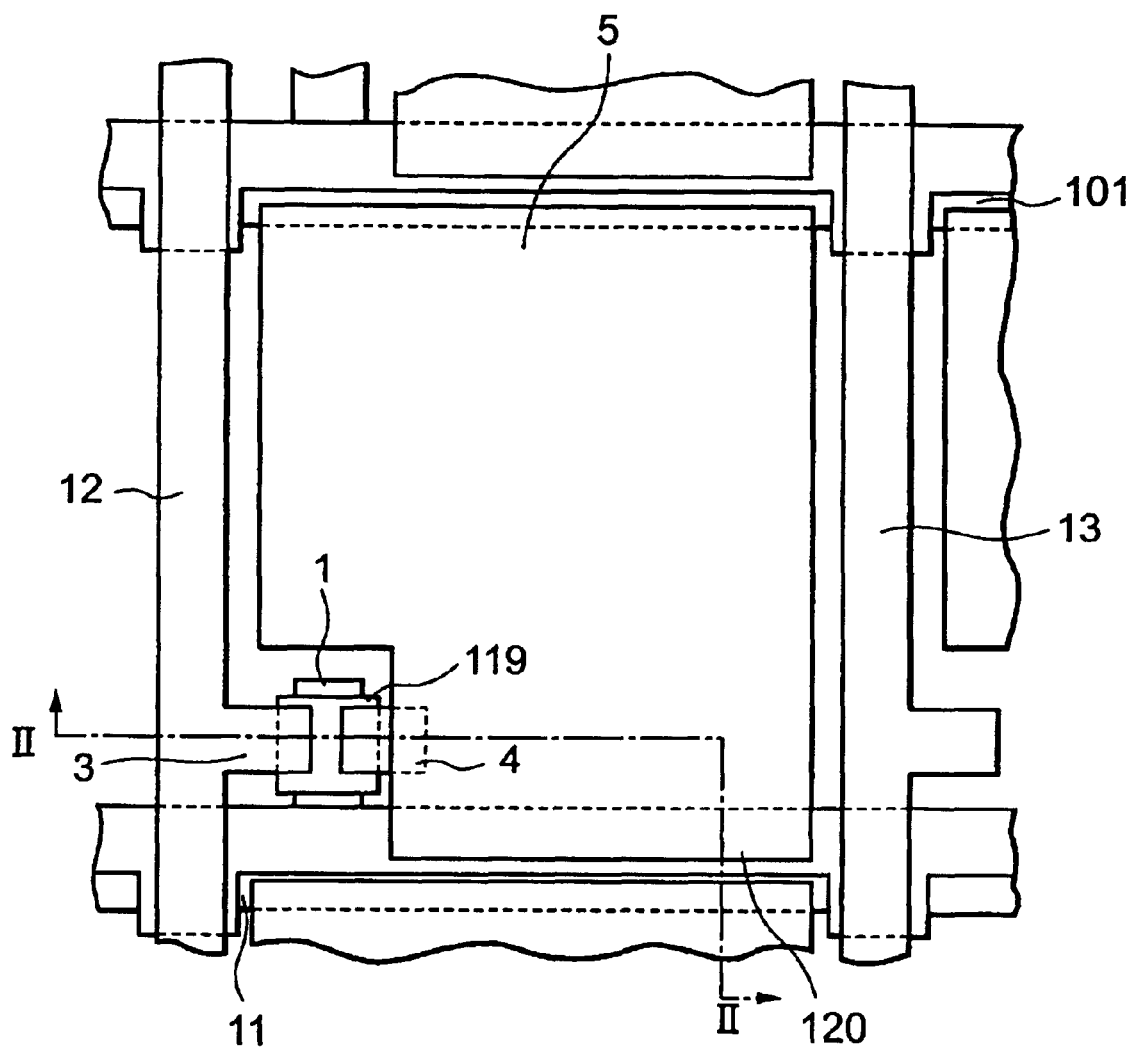
FIG. 16 is a plan view showing a unit pixel of a thin film transistor array substrate provided in an active matrix liquid crystal display device according to a third embodiment of the present invention.

FIG. 16 is a plan view showing a unit pixel of a thin film transistor array substrate provided in an active matrix liquid crystal display device according to a third embodiment of the present invention.

The active matrix liquid crystal display device of the third embodiment shown in FIG. 16 differs from the active matrix liquid crystal display device of the second embodiment shown in FIG. 15, in that the amorphous silicon films 120 provided between the scan line 11 and pixel electrodes 5 are formed into a string shape on the scan line 11.

In the active matrix liquid crystal display device of the second embodiment, there is caused a relatively large difference between the coupling capacity between the pixel electrode 5 and the signal line 12 and that between the pixel electrode 5 and the signal line 13 (generally, the capacity via amorphous silicon film is larger). However, in the active matrix liquid crystal display device of the third embodiment, the difference of coupling capacities relative to the signal lines 12, 13 is reduced, so that a longitudinal crosstalk can be reduced as compared to the second embodiment. Only, as compared to the second embodiment, the delay of a gate pulse to be applied to the scan line 11 is further increased.

The active matrix liquid crystal display device of the third embodiment is constituted in the above manner, to thereby advantageously realize a provision of a liquid crystal display device having an excellent display characteristic without any noticeable longitudinal crosstalk, in addition to the effect obtained by the active matrix liquid crystal display device of the second embodiment.

(Fourth Embodiment)

Figure 17:
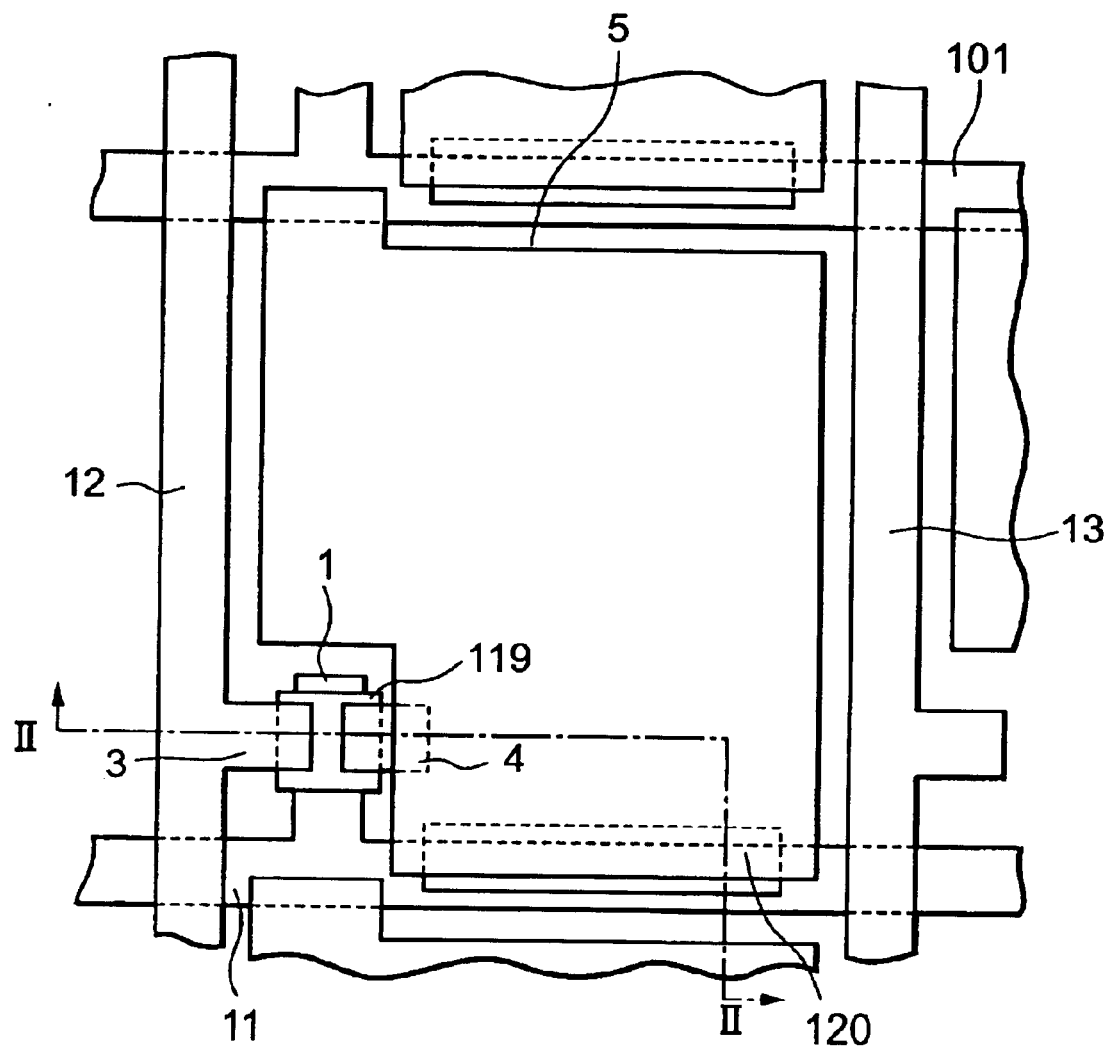
FIG. 17 is a plan view showing a unit pixel of a thin film transistor array substrate provided in an active matrix liquid crystal display device according to a fourth embodiment of the present invention.

FIG. 17 is a plan view showing a unit pixel of a thin film transistor array substrate provided in an active matrix liquid crystal display device according to a fourth embodiment of the present invention.

The active matrix liquid crystal display device of the fourth embodiment shown in FIG. 17 differs from the active matrix liquid crystal display devices of the other embodiments described above, in that the pixel electrode 5 at the applicable stage is overlapped with the scan line 101 at the preceding stage at a portion where the amorphous silicon film 120 at the preceding stage is not formed.

Different from other embodiments, in the fourth embodiment the fluctuation of the whole capacity coupled to the pixel electrode 5 is small even when a matrixing discrepancy is caused in the longitudinal direction upon forming the pixel electrode 5 and the amorphous silicon film 120. Thus, there is reduced an occurrence of a display nonuniformity to be caused by a pixel potential fluctuation due to a pixel capacity fluctuation within a display area.

The active matrix liquid crystal display device of the fourth embodiment is constituted in the above manner, to thereby advantageously realize a provision of a liquid crystal display device having an excellent display characteristic without any noticeable display nonuniformity, in addition to the effect obtained by the active matrix liquid crystal display device of the first embodiment.

As described above, the active matrix liquid crystal display device according to the present invention has a thin film transistor array substrate comprising a plurality of scan lines formed on an insulating substrate, a plurality of signal lines formed to cross the scan lines, thin film transistors formed near intersections between the scan lines and signal lines, respectively, and additional capacity portions connected to pixel electrodes connected to source electrodes of the thin film transistors, respectively, in which a part of the additional capacity portion is formed, via insulating film and semiconductor, between the pixel electrode and that scan line which is connected to a gate electrode of the thin film transistor for switching the pixel electrode; so that an MIS capacity is formed between the scan line and the pixel electrode other than at the TFT portion without any additional manufacturing processes and materials, such that the feedthrough voltage in case of writing a negative voltage relative to the common electrode potential into the pixel (i.e., in case of negative writing) is further increased relative to the feedthrough voltage in case of writing a positive voltage (i.e., in case of positive writing), resulting in that the voltage between the pixel electrode and common electrode can be increased as compared to the conventional active matrix liquid crystal display device. Thus, the present invention can realize, by virtue of the effect based on the aforementioned constitution, a lower power consumption of the liquid crystal display device, and when the power consumption is set equally to that of the conventional, there can be realized an improvement of contrast and a faster response.

What is claimed is:

1. An active matrix liquid crystal display device comprising:

a plurality of scan lines formed on an insulating substrate;

a plurality of signal lines formed to cross said scan lines;

thin film transistors formed near intersections between said scan lines and signal lines, respectively;

pixel electrodes connected to an electrode of said thin film transistors, respectively;

an area surrounded by:

(a) one of said plurality of scan lines;

(b) another one of said plurality of scan lines at a preceding stage;

(c) one of said plurality of signal line which crosses said scan lines; and (d) another one of said plurality of signal lines which crosses said scan lines thereby forming a unit pixel; said plurality of scan lines and said plurality of signal lines thereby forming a plurality of unit pixels, each said unit pixel having one of said thin film transistors and one of said pixel electrodes associated with each said unit pixel;

an accumulation capacity portion formed by said pixel electrode overlapping with said scan line at the preceding stage via insulating film;

an additional capacity portion formed in at least one of said plurality of unit pixels, said additional capacity portion formed by overlapping said pixel electrode associated with said at least one unit pixel, via an insulating film and a semiconductor film each associated with said associated pixel electrode, over the scan line at an applicable stage to be connected to a gate electrode of said thin film transistor associated with the same said at least one unit pixel, said associated thin film transistor for switching said associated pixel electrode of said unit pixel; and said pixel electrode at the next stage overlaps with said scan line at the applicable stage via insulating film to thereby form an accumulation capacity portion for said pixel electrode at the next stage.

2. An active matrix liquid crystal display device of claim 1, wherein said semiconductor film is formed of a semiconductor constituting an active area of said transistor.

3. An active matrix liquid crystal display device of claim 2, wherein said semiconductor film is one selected from an amorphous silicon film and a polycrystal silicon film.

4. An active matrix liquid crystal display device comprising:

a plurality of scan lines formed on an insulating substrate;

a plurality of signal lines formed to cross said scan lines;

thin film transistors formed near intersections between said scan lines and signal lines, respectively;

pixel electrodes connected to an electrode of said thin film transistors, respectively;

an area surrounded by:

(a) one of said plurality of scan lines;

(b) another one of said plurality of scan lines at a preceding stage;

(c) one of said plurality of signal line which crosses said scan lines; and (d) another one of said plurality of signal lines which crosses said scan lines thereby forming a unit pixel;

said plurality of scan lines and said plurality of signal lines thereby forming a plurality of unit pixels, each said unit pixel having one of said thin film transistors and one of said pixel electrodes associated with each said unit pixel;

an accumulation capacity portion formed between a pixel electrode at a next stage and said scan line at an applicable stage to be connected via insulating film to a gate electrode of said thin film transistor associated with said at least one unit pixel; and an additional capacity portion formed in at least one of said plurality of unit pixels, said additional capacity portion formed by overlapping said pixel electrode associated with said at least one unit pixel, via an insulating film and a semiconductor film each associated with said associated pixel electrode, over the scan line at the applicable stage to be connected to a gate electrode of said thin film transistor associated with said at least one unit pixel, said associated thin film transistor for switching said associated pixel electrode of said unit pixel, said semiconductor film being formed in an area separated from said accumulation capacity portion formed between a pixel electrode at a next stage and said scan line at the applicable stage via insulating film.

5. An active matrix liquid crystal display device of claim 4, wherein said additional capacity portion and said accumulation capacity portion are separated from each other in a widthwise direction of said scan line at the applicable stage.

6. An active matrix liquid crystal display device comprising:

a plurality of scan lines formed on an insulating substrate;

a plurality of signal lines formed to cross said scan lines;

thin film transistors formed near intersections between said scan lines and signal lines, respectively;

pixel electrodes connected to an electrode of said thin film transistors, respectively;

an area surrounded by:

(a) one of said plurality of scan lines;

(b) another one of said plurality of scan lines at a preceding stage;

(c) one of said plurality of signal line which crosses said scan lines; and (d) another one of said plurality of signal lines which crosses said scan lines thereby forming a unit pixel;

said plurality of scan lines and said plurality of signal lines thereby forming a plurality of unit pixels, each said unit pixel having one of said thin film transistors and one of said pixel electrodes associated with each said unit pixel;

an accumulation capacity portion formed by a pixel electrode overlapping with said scan line at the preceding stage via insulating film;

an additional capacity portion formed in at least one of said plurality of unit pixels, said additional capacity portion formed by overlapping said pixel electrode associated with said at least one unit pixel, via an insulating film and a semiconductor film each associated with the same said associated pixel electrode, over the scan line at an applicable stage to be connected to a gate electrode of said thin film transistor associated with said at least one unit pixel, said associated thin film transistor for switching said associated pixel electrode of said unit pixel;

said pixel electrode at the next stage overlapping with said scan line at the applicable stage via insulating film to thereby form an accumulation capacity portion for said pixel electrode at the next stage;

said insulating film and semiconductor film constituting said additional capacity portion having a constitution identical with that of the insulating film and semiconductor film constituting said transistor; and the size of said additional capacity portion is determined to be capable of applying a voltage larger than a voltage applied from the exterior, to said liquid crystal layer.

7. An active matrix liquid crystal display device of claim 6, wherein a length of said additional capacity portion along an extending direction of said scan line is shorter than a length of said accumulation capacity portion along the extending direction of said scan line.

* * * * *